(12) United States Patent
Mirafzal (10) Patent No.: US 7,751,993 B2
(45) Date of Patent: Jul. 6, 2010

(54) TECHNIQUE FOR HIGH-IMPEDANCE GROUND FAULT DETECTION AT THE COMMON DC BUS OF MULTI-AXIS DRIVES

(75) Inventor: Behrooz Mirafzal, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 491 days.

(21) Appl. No.: 11/858,412

(22) Filed: Sep. 20, 2007

(65) Prior Publication Data

US 2009/0080127 A1 Mar. 26, 2009

(51) Int. Cl.
*G01R 31/00* (2006.01)

(52) U.S. Cl. ............... 702/58; 702/57; 702/59; 702/183; 324/512; 324/522; 324/500; 324/509; 361/45; 361/63; 361/43; 361/44; 361/42; 340/650; 340/651

(58) Field of Classification Search ............ 702/57, 702/58, 59, 183; 324/512, 522, 500, 509, 324/510, 529, 520, 551, 527, 528, 541, 544, 324/117 H; 361/45, 63, 43, 44, 42, 49; 340/649, 340/650, 651; 714/25, 43, E11.026

See application file for complete search history.

(56) References Cited

U.S. PATENT DOCUMENTS

| | | | | |
|---|---|---|---|---|
| 3,696,367 A | * | 10/1972 | Inamdar | ............ 340/651 |
| 3,714,570 A | | 1/1973 | Howell | |
| 3,801,898 A | * | 4/1974 | Young | ............ 340/651 |
| 4,589,048 A | * | 5/1986 | Takata | ............ 361/42 |
| 4,851,782 A | * | 7/1989 | Jeerings et al. | ............ 324/520 |
| 4,878,142 A | * | 10/1989 | Bergman et al. | ............ 361/80 |
| 4,929,901 A | | 5/1990 | Kimball et al. | |
| 5,386,183 A | | 1/1995 | Cronvich et al. | |
| 5,508,872 A | * | 4/1996 | Khoo et al. | ............ 361/42 |
| 5,530,363 A | * | 6/1996 | Gaughan et al. | ............ 324/509 |
| 5,610,532 A | | 3/1997 | Smith | |
| 6,856,137 B2 | * | 2/2005 | Roden et al. | ............ 324/509 |
| 6,906,525 B2 | * | 6/2005 | Suzuki | ............ 324/509 |
| 7,006,934 B2 | | 2/2006 | Jonker et al. | |
| 7,301,739 B2 | * | 11/2007 | Hamer | ............ 361/42 |
| 2005/0099743 A1 | * | 5/2005 | Lee | ............ 361/42 |
| 2007/0081281 A1 | * | 4/2007 | Hamer | ............ 361/42 |

FOREIGN PATENT DOCUMENTS

JP 06070447 A * 3/1994

\* cited by examiner

*Primary Examiner*—Carol S Tsai
(74) *Attorney, Agent, or Firm*—Turocy & Watson LLP; R. Scott Speroff; John M. Miller (57) ABSTRACT

Systems and methods for detecting ground fault at the common DC bus in a high impedance ground system. A fault detection component can detect characteristics of an electrical signal including phase number (n) and fundamental frequency (H). A fast Fourier transform is performed at (n×H) and (2n×H), and the two values are compared. A healthy system (no ground fault) can display a large difference between (n×H) and (2n×H), while in an unhealthy system the difference can be minimal. A system and method of detecting variable phase number and fundamental frequency can be used in the calculation to perform the ground fault detection when these characteristics are variable.

20 Claims, 8 Drawing Sheets

TECHNIQUE FOR HIGH-IMPEDANCE GROUND FAULT DETECTION AT THE COMMON DC BUS OF MULTI-AXIS DRIVES

BACKGROUND

Industrial applications are increasingly automated, with machines taking over the lion's share of the physical workload in industry. Most industrial machinery is driven by electric motor drives that push, pull, rotate, or otherwise manipulate industrial equipment under the supervision of skilled engineers who orchestrate the many complex and subtle movements necessary to bring a product through an assembly line. These drives can take many different forms and are produced in many different designs, but share many characteristics. Electric motor drives are also imperfect creations made from imperfect materials, and are susceptible to faults. While not all imperfections have been eliminated, those remaining tend to be subtle and difficult to detect using traditional methods.

In the field of electric motor drives, a motor is typically connected to a drive, which provides electrical power to the motor in a controlled manner. The motor-drive systems are commonly employed to provide speed control or torque control in an industrial application setting. For AC motors, electrical power is converted in the drive from an AC power supply (typically from a utility) into DC voltage. The DC voltage is then converted, using an inverter, into AC voltage (current) in which the frequency and amplitude can be controlled providing motor speed and torque controllability.

The existing techniques for ground fault detection are based on the measurement of overload current of two or more phase lines. Another method measures the common-mode current and compares the measured value with a threshold value. However, the normal capacitive leakage current value could be comparable to ground fault current caused by a high impedance ground fault. High impedance faults are short circuit faults with fault currents smaller than what a traditional over-current protective relay (or fuse) can detect. The currents caused by these faults are smaller in magnitude than the thresholds of traditional ground fault detection devices, so reliable detection of these high-impedance faults is challenging.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

A fault detection component communicates with a DC bus, senses voltage and other characteristics of the electrical signal, and performs a fast Fourier transform on the electrical signal. The response at (n×H) and (2n×H) is compared, where n is the phase number and H is the fundamental frequency of the electrical signal. In a three phase, 60 Hz system, (n×H) and (2n×H) are 180 and 360 Hz respectively. In a healthy system, the difference between the frequency components (obtained from the Fourier transform of the DC bus voltage) at (n×H) and (2n×H) is large, and in an unhealthy system the difference is small. (Values are relative; one skilled in the art will appreciate that experience with different equipment and configurations can yield different absolute values without affecting the scope of the subject disclosure.) The values are compared, and if ground fault is detected an alarm can be delivered to an appropriate oversight mechanism.

In an embodiment of the subject disclosure, the DC bus is part of a high impedance ground system. The system and methods disclosed are capable of detecting ground fault in a high impedance ground system (caused by resistors, stray capacitors, or other components) as well as in a solid ground system. In an aspect, the phase number (n) and fundamental frequency (H) are variable. The subject disclosure can detect a present phase number and fundamental frequency and use the values to detect ground fault even at different or changing values for n and H. In another aspect, the phase number and fundamental frequency can be purposefully manipulated in an effort to explore the performance of the system at different values of n and H.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the term "component," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Examples are provided solely for purposes of clarity and understanding and are not meant to limit the subject innovation or relevant portion thereof in any manner. It is to be appreciated that a myriad of additional or alternate examples could have been presented, but have been omitted for purposes of brevity. Furthermore, all or portions of the subject innovation may be implemented as a method, apparatus or article of manufacture using standard programming and/or engineering techniques to produce software, firmware, hardware, or any combination thereof to control a computer (or a microcontroller/microprocessor) to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
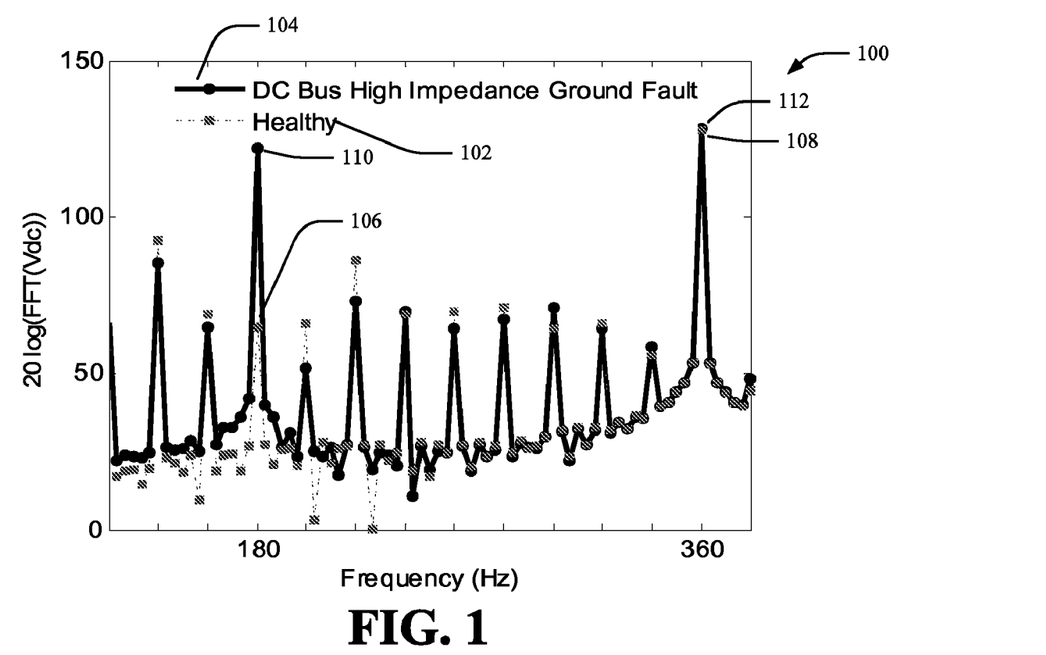
FIG. 1 is a graph of a fast Fourier transform of an unhealthy (showing high impedance ground fault) and a healthy system.

Referring now to the figures, FIG. 1 illustrates a frequency spectrum 100 of DC bus voltage of an AC drive. For purposes of brevity, the principles of the subject disclosure will be discussed in terms of an electric motor drive; however, it is to be appreciated that the systems, methods, and techniques disclosed herein can be applied to detect faults in any system involving an AC to DC converter (rectifier). FIG. 1 depicts a plot of a fast Fourier transform of a healthy system 102 and an unhealthy system 104, both in 20 log (FFT (Vdc)) (See Y-axis of FIG. 1). The unhealthy system 104 contains a ground fault, where current is leaking in an undesirable manner. Conventional diagnosis techniques focus on the current passing through the ground fault, as has previously been a reasonable approach to the problem. Practice in this area has suggested repeatedly that to detect a ground fault, the leakage current is the desirable method. As will be shown, this approach has limited utility—where there is no high-impedance (e.g. solid ground)—measuring current has proved a workable solution in some limited circumstances. However, conventional methodologies have not satisfactorily solved the problem when there is high impedance between the measured area and ground. An obstacle to the success of conventional, current-focused attempts is the low level of current present in the ground fault. Conventional wisdom suggests that more sensitive, elaborate, or subtle measurement equipment is necessary to solve the problem.

Breaking with traditional techniques, the subject disclosure focuses on the frequency of the voltage in the DC bus— not the current magnitude alone. It is to be appreciated that the values and embodiments presented here are merely exemplary, and serve to describe the underlying physical nature of systems in which the subject disclosure can be applied, but in no way limit the scope of the disclosure. FIG. 1 depicts a 60 Hertz (Hz), three phase system with the X-axis representing frequency in Hertz. As can be readily seen from FIG. 1, the healthy system 102 at 180 Hz (reference numeral 106), has a FFT value of approximately 70. The healthy system 102 at 360 Hz (reference numeral 108) has a FFT value of approximately 130. In contrast, the unhealthy system 104 at the same X-axis positions has a value of approximately 130 at both positions (180 Hz and 360 Hz; reference numerals 110 and 112, respectively). Therefore, there is a measurable distinction between the healthy case and the unhealthy case. If the FFT of the 180 Hz component and the 360 Hz component are sufficiently similar, a ground fault is likely present. If there is a sufficient difference between the two components, there is likely no ground fault.

FIG. 1 represents a typical case, where the components other than 180 Hz and 360 Hz (in a 60 Hz, three-phase rectifier system) are noisy and do not facilitate easy detection of information The fast Fourier transform values for the off components are scattered, unpredictable, and unreliable for purposes of ground fault detection as applied in the subject disclosure. The same phenomenon exists for any frequency system, and systems of any phase number (n), and can be described by the following equation:

$$FI=A(2n \times H)-A(n \times H)$$

where FI is the fault indicator, n is the phase number of the AC input voltage, and H is its fundamental frequency in Hertz. FIG. 1 shows a typical three-phase rectifier system using 60 Hz AC input, so the numbers would be:

$$FI=A((2 \times 3) \times 60)-A(3 \times 60)$$

$$FI=A(360)-A(180)$$

The same phenomenon exists at any combination of phase number and frequency. The subject disclosure takes advantage of this characteristic in a novel and useful application as will be seen herein. If the fault indicator (or absolute value of the fault indicator) is less than a predetermined threshold, which can be a positive real number, ground fault is found.

Figure 2:
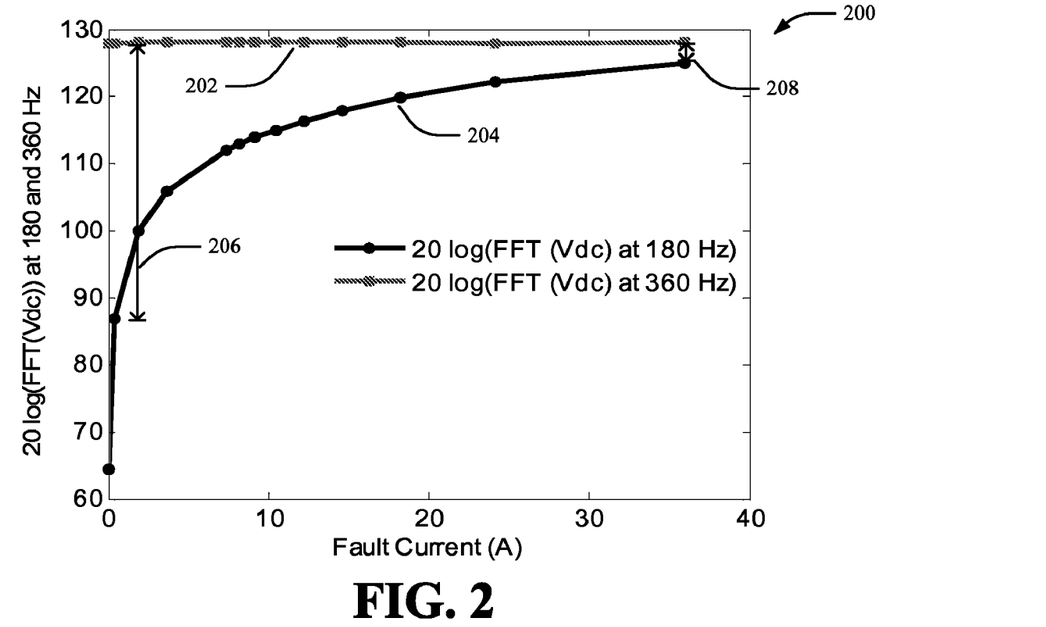
FIG. 2 is a graph of a 180 Hz and 360 Hz component as a function of fault current.

FIG. 2 shows a graph 200 of the same phenomenon from a different perspective. Lines 202 and 204 represent the 20 log FFT(Vdc) at 360 and 180 Hz, respectively, as a function of the fault current (X-axis). At the left side of the graph, there is little or no fault current, and moving to the right of the graph the fault current increases. As can be seen from line 204, when there is little or no fault current, there is a large difference 206 between the fast Fourier transform of the 360 Hz and 180 Hz components; when there is fault current, the 180 Hz component approaches the 360 Hz component, and the difference 208 will be small. This phenomenon can be used to detect ground fault by analyzing the two components and measuring the difference between them. If the difference (or absolute value of the difference) is below a predetermined threshold, there is ground fault current. Once ground fault is detected the situation can be remedied or corrected as necessary to eliminate the ground fault. In many applications, ground fault can be remedied using a wide variety of techniques which are only useful if the ground fault can be detected.

Figure 3:
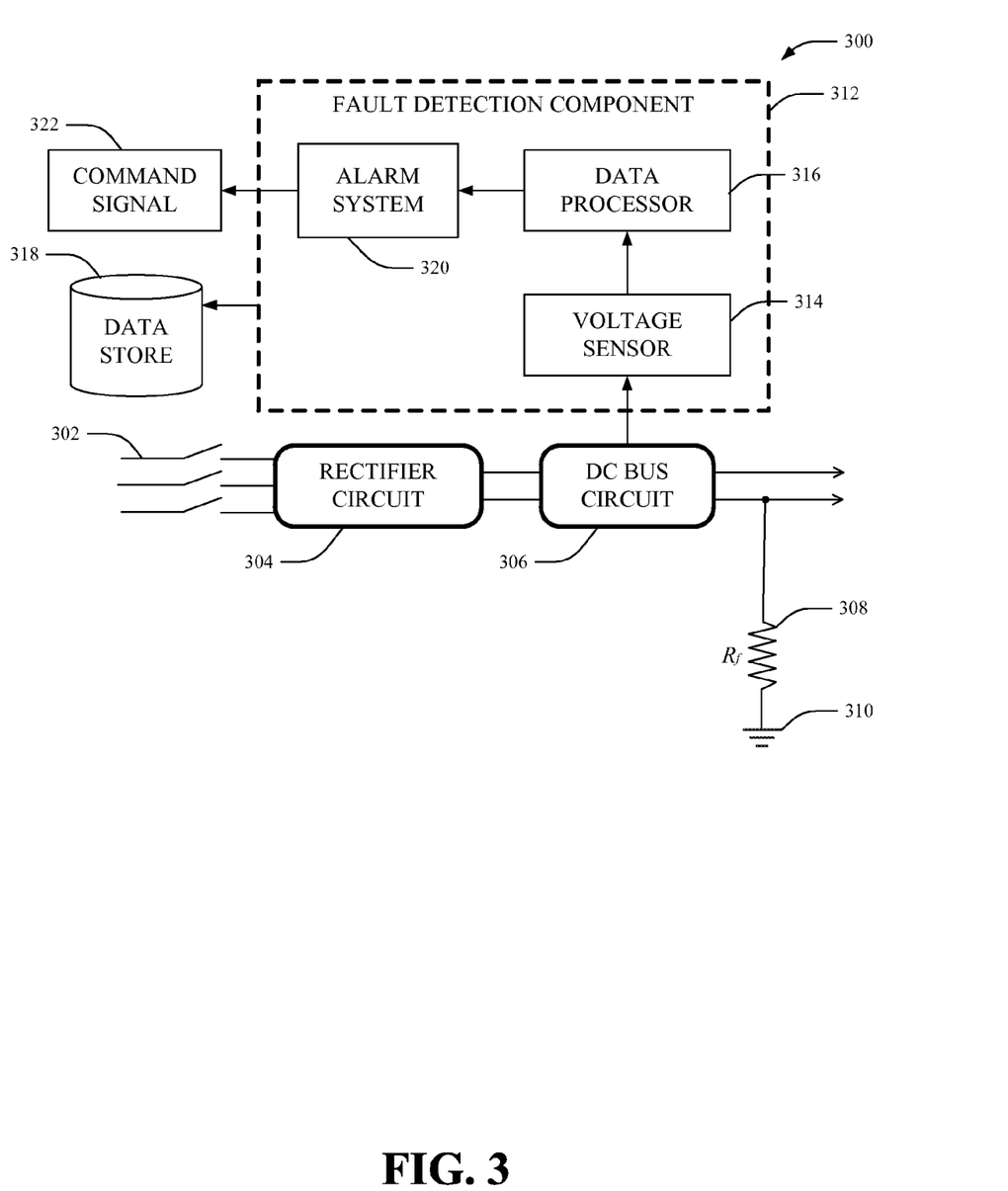
FIG. 3 is a block diagram demonstrating a system that detects ground fault in a high impedance ground as well as a solid ground system.

FIG. 3 depicts a system 300 that utilizes the above described phenomenon to detect ground fault in both a high impedance ground configuration or a configuration without high impedance to ground (e.g., solid ground). For purposes of brevity, the circumstances in which the subject innovation is described is a motor drive system; however, it is to be appreciated that the systems, methods, and techniques described herein can be used in a virtually unlimited number of applications. Input 302 supplies the electrical input to the system, and can implement a rectifier 304, which can be a three-phase rectifier 304 (e.g., from a utility) or a single phase system (e.g. a laptop computer power adaptor) or a system of any other phase number. Rectifier 304 is connected to a DC bus 306, as can be found in a wide variety of circuits.

The subject innovation is superior to conventional fault detection systems because it is independent of current level. The system described herein uses frequency measurements in conjunction with, or in place of currency level measurements to detect fault. If there are other types of leakage current, caused by a high frequency (or high switch in frequency), or by stray capacitors which can be found between windings and frames of motors, or between the windings and the ground path, which also can generate leakage current, and can also provide high impedance ground. Detection systems on the current level will be corrupted if based on current level because of these components. The DC bus circuit 306 can be found in any of a multitude of applications that employ a DC bus circuit, and can connect to any other appropriate circuit or component. In an example, high impedance can be obtained through the use of a resistor $R_f$ 308 connected to ground 310. High impedance can be caused by many different components, and the system described herein can be applied regardless of the cause, the source, or the location of the high impedance. As such, the resistor $R_f$ 310 can be found at different locations in the diagram of FIG. 3 without altering the scope of the subject innovation.

Fault detection component 312, in an aspect, can contain the components necessary to detect ground fault according to the subject innovation, and can be applied to detect ground fault current at the DC bus. Fault detection component 312 can be applied anywhere on the DC bus, as required or prudent in a given application. The components described herein as part of the fault detection component 312 can alternatively be implemented as independent components working together to achieve the same functionality as herein described. A voltage sensor 314 can detect voltage and other electrical characteristics found at the DC bus 306, and can gather information sufficient to produce a graph similar to the graph depicted in FIGS. 1 and 2. The information gathered by the voltage sensor 314 can include the phase number of the system 300 (e.g., a single phase system, a standard three phase system). Voltage sensor 314 can verify this phase number, and determine a frequency spectrum from which to receive data. For example, in a three phase system, the values of 180 and 360 Hz are helpful in detecting ground fault detection system, so the voltage sensor 314, knowing these important values, can sample from somewhere below 180 Hz to somewhere above 360 Hz. Alternatively, the voltage sensor 314 can surround only the area surrounding the two values (e.g., 160-200, and 340-380) and omit the middle range to conserve resources. Since the important peaks occur at different value pairs depending on the phase number, knowing this number before creating the information depicted in FIG. 1 saves time and computing resources.

This information can be passed to a data processor 316 which analyzes the information, and can perform a fast Fourier transform on the information. In a healthy system, there will be a large difference between the values, while in an unhealthy system the difference is small. Detection of ground fault can be easily carried out by comparing the two values, and if a predetermined threshold is exceeded, there is no ground fault. The threshold can vary with the application and a variety of different variables present in a given situation, and one skilled in the art will appreciate that although the threshold may vary, the principles of the subject innovation may still be practiced, and are not limited to a particular scenario. An advantage of this system 300 is that it can be independent of the current level in the DC bus and the leakage current. Also, the system 300 can detect ground fault whether there is high impedance or solid ground. The subject innovation can completely replace other techniques because it performs at least equally as well as other techniques in a solid ground condition, and can also detect ground fault in a high impedance system—something that cannot easily be done by conventional techniques.

Information collected by the voltage sensor 314 and compiled by the data processor 316 can be stored in a data store 318, which can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store of the present systems and methods is intended to comprise, without being limited to, these and any other suitable types of memory.

If and when a fault is detected, a signal can be passed to an alarm system 320 which can inform a user or another oversight mechanism of the fact. The oversight mechanism can comprise an automated system, in which case a command signal 322 can be delivered to instruct the automated system to take some maintenance or corrective action. It is to be appreciated that the action taken to remedy the ground fault situation can be any appropriate measures, as determined by a skilled operator, and as appropriate for the application of the system. Ground fault, and high impedance ground fault, can be present in a multitude of electrical applications, and there is an equally high number of solutions, all of which can be initiated by alarm system 320.

Figure 4:
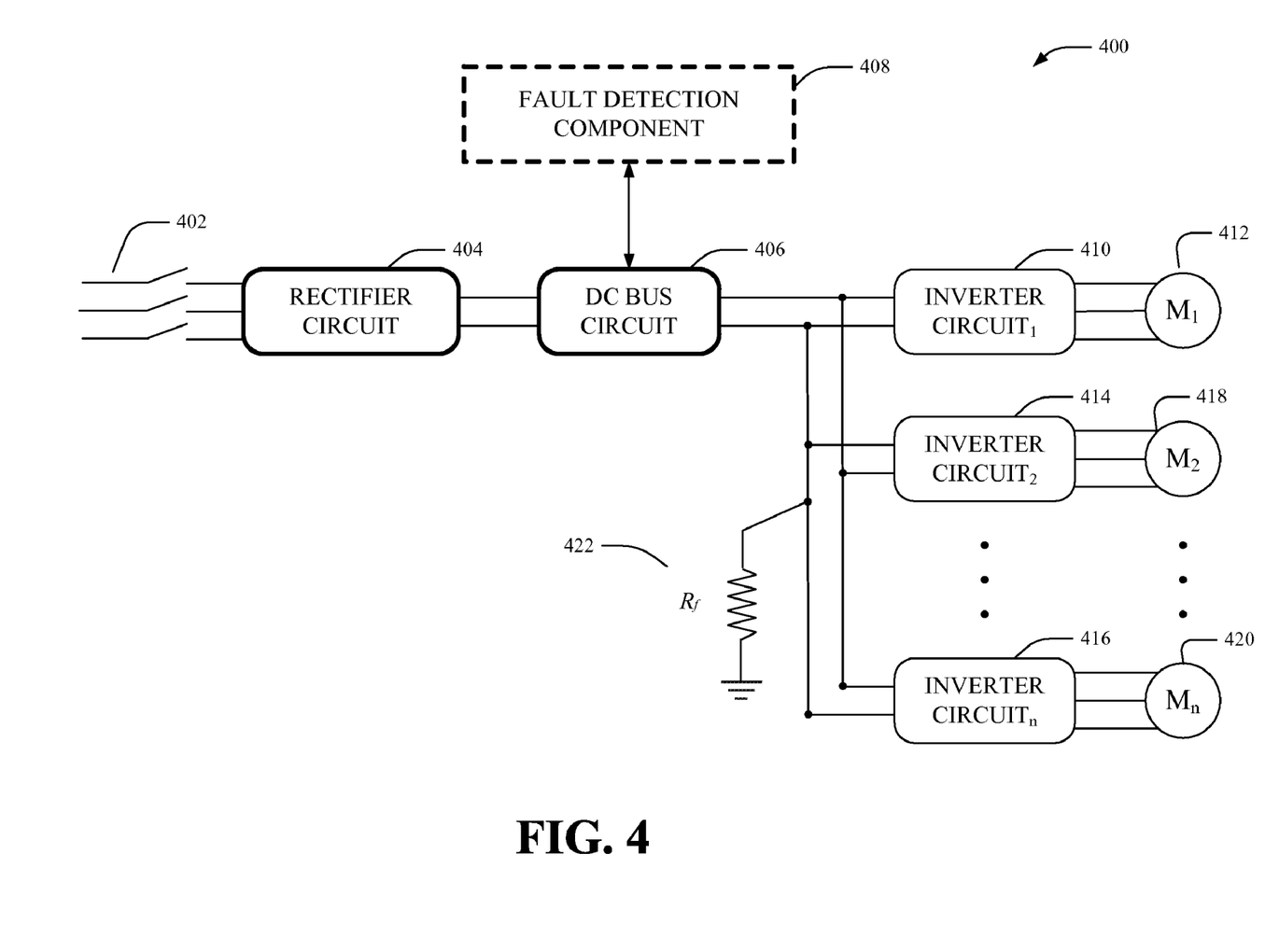
FIG. 4 is a block diagram depicting a system that detects ground fault in connection with a series of inverters with associated motors.

FIG. 4 represents a system 400 implementing the subject innovation in the context of a series of motors. It is to be appreciated that this is but one possible utilization of the subject innovation, and is included for explanatory purposes only and does not limit the innovation's scope in any way. Input 402 reaches a rectifier circuit 404 which is connected to a DC bus 406, substantially similar to the system depicted in FIG. 3. Fault detection component 408 can be brought into electrical communication with the DC bus circuit 406 at any appropriate location. Also connected to the DC bus 406 is an inverter circuit 410 which serves in this example to regulate power delivery to a motor 412. In an aspect, a series of inverter circuits 414 and 416 can also be connected to the DC bus 406, each regulating a motor 418 and 420 or another comparable device. In this example, the inverters 410, 414, and 416 can convert DC current back into AC current for power delivery to the motors 412, 418, and 420. The AC current received as input 402 can at times be irregular and thus improper for use directly with fine electrical motors whose operation must be smooth and controllable, and cannot afford the irregularities that can be caused by such unruly AC current. However, AC current can be advantageously used to power motors 412, 418, and 420 and other similar devices. (Once again, it is to be appreciated that the motors shown can be replaced with any comparable device, and the subject innovation is not limited to power delivery to motors.) Converting the input 402 into DC current, delivering the power by means of a DC bus 406, and subsequently converting back into controlled AC current provides controlled power delivery to a motor 412 (or series of motors 418, 420).

The above described operation commonly includes high impedance ground through a resistor $R_f$ 422, or another component such as a capacitor or the like. These components can provide functionality that is desired; however, they create difficulty in detecting ground fault leakage current. Conventional techniques are ineffective at detecting high impedance ground fault, but the subject disclosed innovation is capable of detecting ground fault—both in a solid ground configuration and in the case of high impedance ground.

According to another embodiment of the subject innovation, asymmetry in the AC circuit can be detected, but is prevented from confusing the above described techniques for detecting ground fault leakage current. The subject disclosure is immune to asymmetry in the AC circuit, which significantly impacts the magnitudes of the second and fourth harmonics of AC power source in the DC voltage waveform in a three phase system. For instance, if the input 402 is a 60 Hz three-phase AC voltage source, any asymmetry in the inverter-cable-motor circuit appears as an increase in the frequency components of the DC voltage at (2×60 Hz=120 Hz) 120 Hz and (4×60 Hz=240 Hz) 240 Hz without effecting the magnitude of the DC voltage frequency spectrum at (3×60=180 Hz) 180 Hz and (6×60 Hz=360 Hz) 360 Hz frequency components. Therefore, asymmetry in an AC circuit does not confuse this technique, enabling distinction between a high-impedance ground fault at the common DC bus from asymmetry in the AC circuits.

Figure 5:
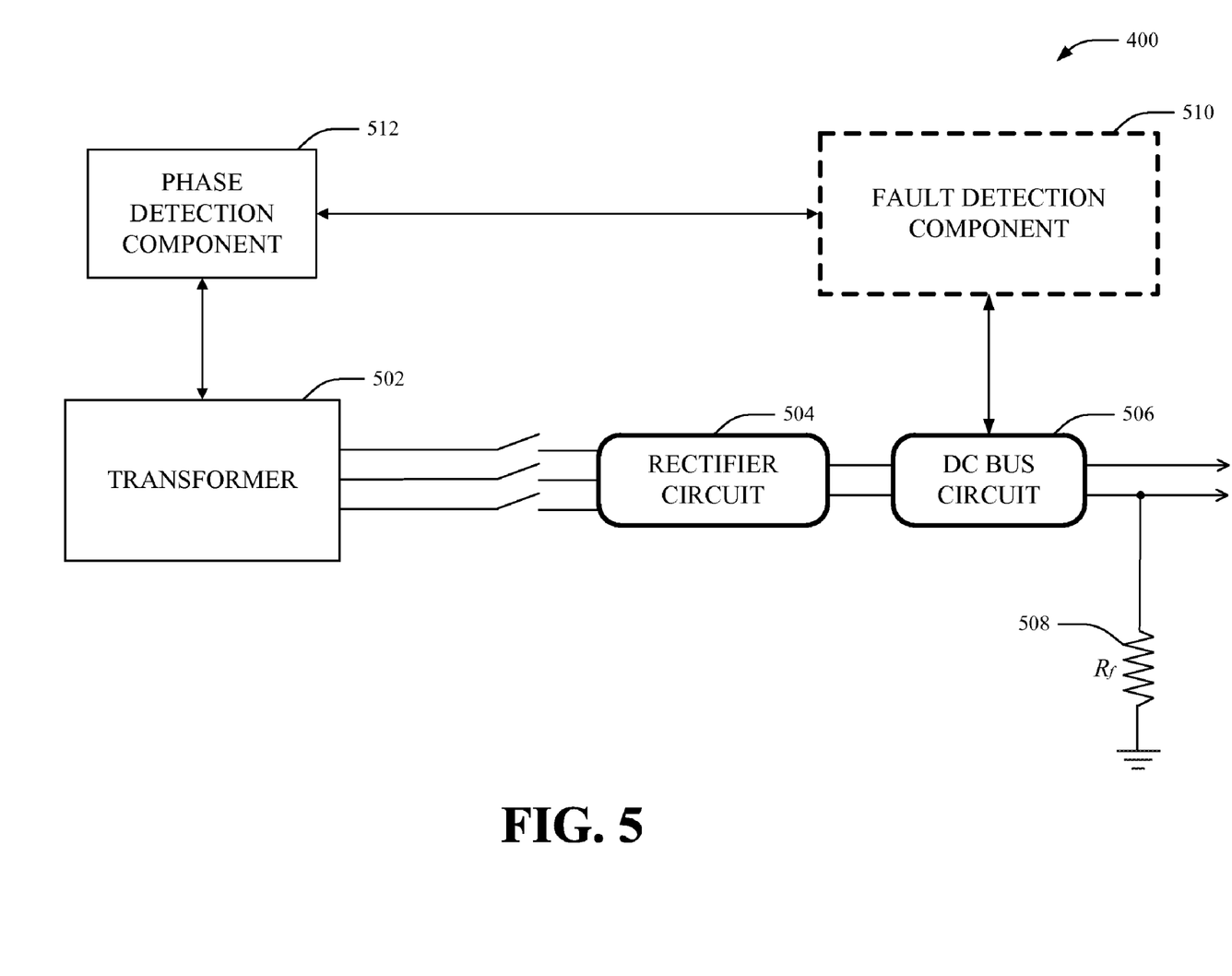
FIG. 5 is a block diagram illustrating a system that detects ground fault in a high impedance ground and a solid ground system, including a phase detection component.

FIG. 5 depicts a system 500 that detects the phase characteristics and frequency of the incoming electrical signal. A transformer 502 provides electricity for an application, and can comprise any source of electrical power, from a utility to a generator and any other applicable source. Rectifier circuit 504 and DC bus circuit 506 can operate as described with respect to FIGS. 3 and 4, and can be part of a high impedance ground fault system, caused by the presence of resistor $R_f$ 508. The system 500 can operate equally in a solid ground system without resistor $R_f$ 508, or with another cause of high impedance ground. It is to be appreciated that system 500 is shown with specific components merely for illustration, and the features and organization of the components shown in FIG. 5 do not limit the subject innovation in any way. Fault detection component 510 can be in electrical communication with the DC bus 506 at any convenient point, and can provide the ground fault detecting capabilities as described previously herein. Input characteristic detection component 512 can interact with transformer 502 and detect characteristics of the input signal. In an aspect, the phase number and frequency of the incoming AC current can be detected, and provided to fault detection component 510 for use in analyzing ground fault. The information can be used to narrow the search to a smaller range of frequencies than would be prudent without the information provided by the input characteristic detection component 512, thereby increasing the effectiveness of the fault detection component. For example, in a three phase aircraft system where the frequency of AC input is traditionally 400 Hz, the voltage sensor of the fault detection component 510 can analyze the area of 1200 Hz (1×3×400) and 2400 Hz (2×3×400), perform the fast Fourier transform of the two, and compare the results to detect fault. The input characteristic detection component 512 instructs the fault detection component 510 where to search for fault, resulting in a more efficient ground fault detection system 500.

In another aspect, the characteristics of the input (e.g., phase number and frequency) can comprise continuously changing variables, so the ground fault, if any, will be detectable only at different frequency values at any given moment. Input phase characteristic detection component 512 can overcome this difficulty by continuously providing the fault detection component 510 with information that enables the ground fault to be identified despite changing phases and frequencies.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of machine learning, or knowledge or rule based components, sub-components, processes, means, methodologies, or mechanisms (e.g. support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 6:
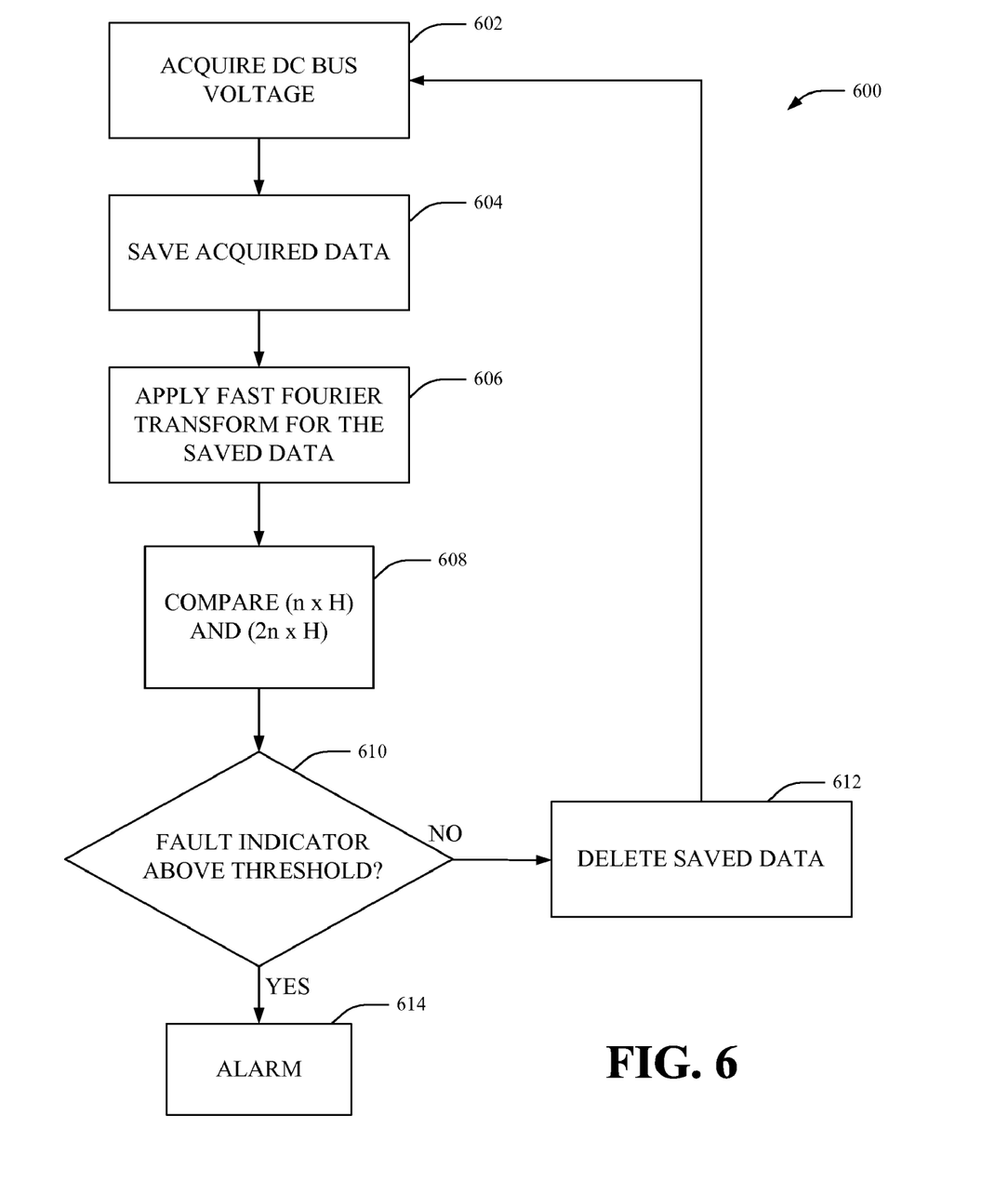
FIG. 6 is a flow chart diagram depicting a methodology that facilitates detection of ground fault.
Figure 7:
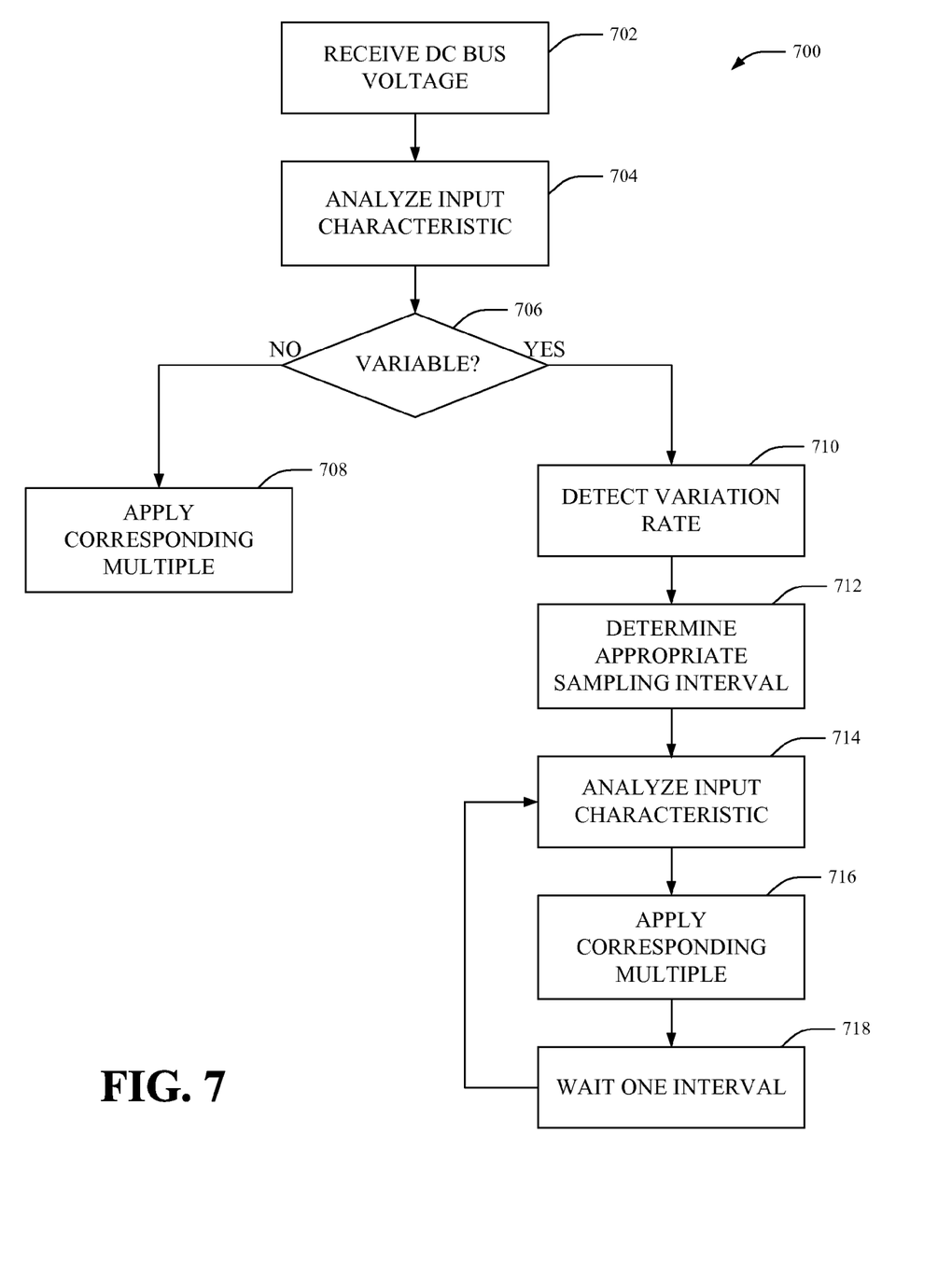
FIG. 7 is a flow chart diagram illustrating a methodology that facilitates detection of ground fault where characteristics such as phase number and fundamental frequency are viable.

In view of the illustrative systems described supra, methodologies that may be implemented in accordance with the disclosed subject matter will be better appreciated with reference to the flow charts of FIGS. 6 and 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 illustrates a methodology 600 that facilitates detection of ground fault leakage current at a DC bus. In contrast to previously used methods, the subject disclosure is based primarily on the frequency at the DC bus, rather than the current amplitude. Therefore, the subject systems are able to detect ground fault even in the case of a high impedance ground system, where previous approaches have failed. At reference numeral 602, the voltage at the DC bus is acquired, and certain characteristics of the signal are analyzed. In particular, the phase number of the system (e.g. a single phase system, a three phase system, etc.) can be determined. These characteristics can be gathered from the incoming AC current, before the signal is transformed into DC current. The information can be stored at reference numeral 604 in memory. At reference numeral 606, a fast Fourier transform of the voltage can be performed on the voltage signal according to the saved data. The fast Fourier transform can be created over a wide spectrum of frequencies for a more complete analysis of the electrical signal. At reference numeral 608, the fast Fourier transform at two important points can be compared, the point of comparison being a function of the phase number and frequency of the electrical signal as detected at reference numeral 602. In a traditional 60 Hz, three phase system, for example, the two important points are 180 Hz and 360 Hz. In general, the two points of analysis are related to phase number and frequency as follows:

$$X=A(n \times H)$$

$$Y=A(2n \times H)$$

where n is the phase number, and H is the fundamental frequency of the electrical signal. At reference numeral 610, if the absolute value of the difference between X and Y (sometimes referred to herein as the fault indicator) is smaller than a predetermined threshold, ground fault is present at the DC bus. The above conclusion is based on the electrical phenomenon described previously herein with respect to FIGS. 1 and 2, a phenomenon which allows simple, reliable detection of ground fault—even high impedance ground fault—which is independent of leakage current levels and therefore superior to previous methods.

The methodology 600 also provides for continuous or testing of a DC bus for ground fault, by repeating as frequently as is prudent in a given application. At reference numeral 612, if there is sufficient difference between X and Y to indicate there is no ground fault present, the saved data can be deleted and the methodology 600 can repeat at reference numeral 602. It is to be appreciated that the data from each pass may be valuable for later diagnosis, and as such, rather than be deleted, can be preserved to another location in a log or other commonly implemented storage routine. If, however, the threshold condition is met, at reference numeral 614 an alarm can be provided to a user, a machine, or any other appropriate oversight mechanism.

FIG. 7 depicts a methodology 700 that can be used to detect ground fault in a high impedance ground, or a solid ground system when characteristics of the incoming electrical signal are variable or fixed. At reference numeral 702, an electrical signal is received; at reference numeral 704 the signal is analyzed for characteristics such as phase number and frequency. At reference numeral 706, the stability of these characteristics can be measured. If there is no variation, then an appropriate multiple can be applied at reference numeral 708 and the ground fault can be detected as described with respect to FIG. 6. If, however, variation in the signal is detected, at reference numeral 710 the variation rate can be determined. If variable, the rate of variation can be determined; the characteristics of the signal can vary greatly or minimally, continuously or irregularly, which can be determined at reference numeral 710. At reference numeral 712, an appropriate sampling interval can be determined, according to the detected variation rate. For example, if the variation rate is predictable and relatively low, then the sampling interval can be appropriately low. On the other hand, if the variation rate is irregular and erratic, the characteristics of the input signal can be analyzed more frequently. For each sampling interval, appropriate multiples can be determined and applied at reference numeral 716, at which point the ground fault of the system can be detected. The methodology 700 can repeat by waiting one interval of time at reference numeral 718 between loops.

In an aspect, methodology 700 can be applied to detect the ground fault performance of a high impedance or solid ground system under different electrical conditions. The input characteristics can be purposefully manipulated in order to explore a given circuit's response to current of different characteristics such as phase number and frequency. In the case of purposeful manipulation of the input characteristics, the acts of detecting variation rate 710 and determining appropriate interval 712 can be performed not in response to an unknown input characteristic, but according to a predetermined diagnosis plan.

Figure 8:
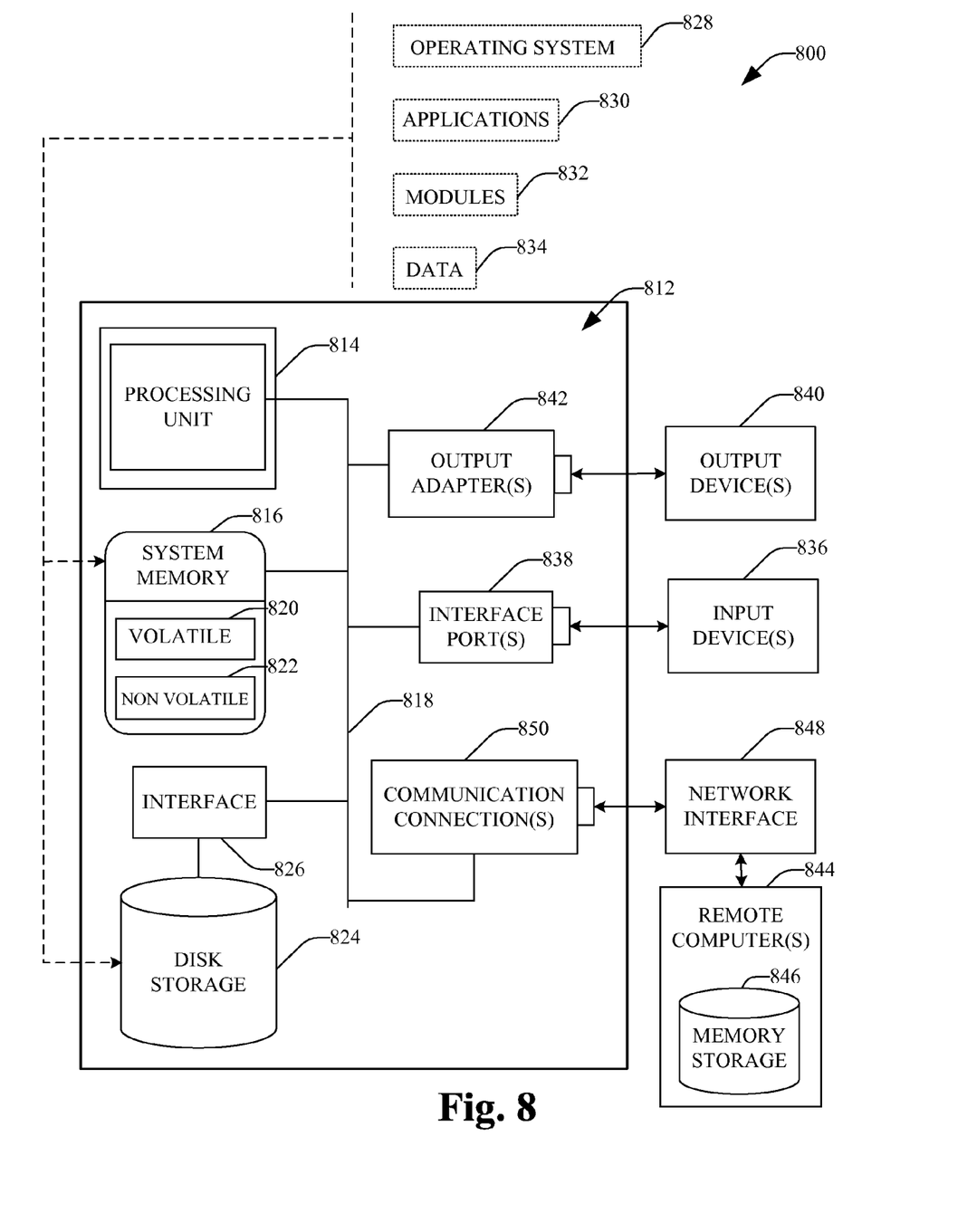
FIG. 8 is a schematic block diagram illustrating a suitable operating environment.
Figure 9:
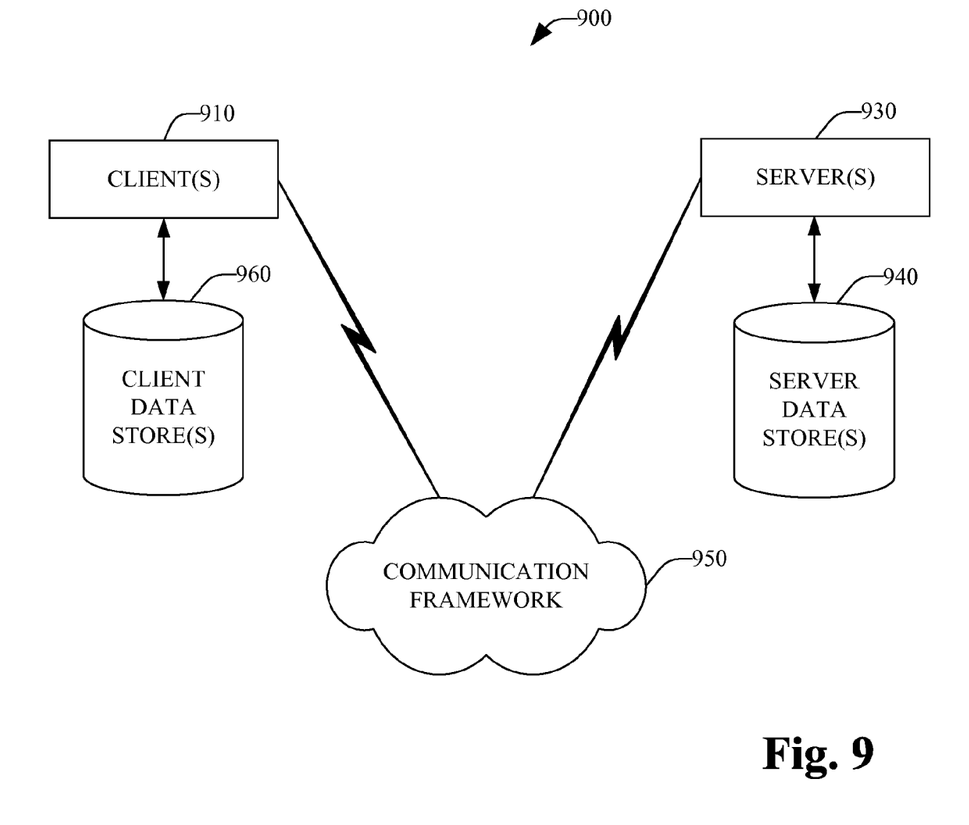
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary environment 800 for implementing various aspects disclosed herein includes a computer 812 (e.g., desktop, laptop, server, hand held, programmable consumer or industrial electronics . . . ). The computer 812 includes a processing unit 814, a system memory 816, and a system bus 818. The system bus 818 couples system components including, but not limited to, the system memory 816 to the processing unit 814. The processing unit 814 can be any of various available microprocessors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example, disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 800. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812 and to output information from computer 812 to an output device 840. Output adapter 842 is provided to illustrate that there are some output devices 840 like displays (e.g., flat panel and CRT), speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems, power modems and DSL modems, ISDN adapters, and Ethernet cards or components.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes.

The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A DC bus ground fault detection system, comprising:
   a voltage sensor that detects voltage at a DC bus;
   a input characteristic detection component that detects at least one of phase number (n) or fundamental frequency (H) of the electrical signal;

a data processor that performs a fast Fourier transform on the electrical signal, analyzes the fast Fourier transform response at (n×H) and (2n×H);

an alarm system that provides an indication of ground fault if (n×H)−(2n×H) is less than a predetermined threshold.

2. The system of claim 1, further comprising a command signal delivered by the alarm system to control an oversight mechanism if ground fault is detected.

3. The system of claim 1, the DC bus is part of a high impedance ground system.

4. The system of claim 1, the input characteristic determination component determines a characteristic of an AC input.

5. The system of claim 1, the phase number (n) and fundamental frequency (H) are variable.

6. The system of claim 5, at least one of the voltage, phase number (n) or fundamental frequency (H) of the electrical signal is determined at predetermined intervals.

7. The system of claim 1, the DC bus is connected to an inverter in a multi-axis drive system.

8. The system of claim 7, the DC bus is implemented in a three phase system with a fundamental frequency of 60 Hz, the voltage sensor and data processor detect asymmetry on an AC side of the inverter by detecting high values near 120 Hz and 240 Hz of the fast Fourier transform.

9. A method of detecting ground fault, comprising:
receiving an electrical input to a DC bus;
sensing the voltage at the DC bus;
determining the phase number (n) and fundamental frequency (H) of the electrical signal at the DC bus;
applying a fast Fourier transform to the voltage;
comparing the value of the fast Fourier transform at (n×H) and (2n×H);
assessing ground fault if the difference between the fast Fourier transform at (n×H) and the fast Fourier transform at (2n×H) is less than a threshold.

10. The method of claim 9, further comprising applying a fast Fourier transform to a range surrounding (n×H), and to another voltage range surrounding (2n×H).

11. The method of claim 9, further comprising applying a fast Fourier transform to a voltage range from lower than (n×H) and higher than (2n×H).

12. The method of claim 9, further comprising delivering an alarm to an oversight mechanism if ground fault is detected.

13. The method of claim 9, receiving an electrical input to a DC bus is performed in a high impedance ground system.

14. The method of claim 9, further comprising:
manipulating at least one of the phase number (n) or fundamental frequency (H) of the electrical input; and
determining at least one of the manipulated phase number (n) or the manipulated fundamental frequency (H).

15. The method of claim 14, further comprising diagnosing the DC bus under the manipulated conditions.

16. The method of claim 9, further comprising:
receiving an electrical signal with variable at least one of phase number (n) or fundamental frequency (H); and
determining at least one of the manipulated phase number (n) or the manipulated fundamental frequency (H) at discrete intervals.

17. The method of claim 16, further comprising:
determining a variation rate;
creating an interval according to the variation rate;
assessing ground fault at the interval.

18. The method of claim 17, further comprising storing data obtained from an assessment of ground fault, and providing the data to a user.

19. The method of claim 17, further comprising adjusting the variation rate between intervals.

20. A system of detecting ground fault at a common DC bus of a high impedance ground system, comprising:
means for analyzing voltage at the DC bus;
means for detecting at least one of phase number (n) and fundamental frequency (H);
means for applying a fast Fourier transform to the voltage at (n×H) and (2n×H); and
means for providing an alarm if the difference between the fast Fourier transform at (n×H) and the fast Fourier transform at (2n×H) is less than a threshold.

* * * * *